United States Patent [19]

Kahane

[11] 4,252,713

[45] Feb. 24, 1981

[54] METHOD OF GRAFTING A POLYMER TO FILLER MATERIALS

[75] Inventor: Lucien Kahane, Villers-sous-Saint Leu, France

[73] Assignee: Union Minerale, Villers-sous-Saint Leu, France

[21] Appl. No.: 945,491

[22] Filed: Sep. 25, 1978

Related U.S. Application Data

[62] Division of Ser. No. 670,557, Mar. 26, 1976, Pat. No. 4,129,549.

[30] Foreign Application Priority Data

Mar. 27, 1975 [FR] France .................................. 75 09626
Mar. 8, 1976 [FR] France .................................. 76 06508

[51] Int. Cl.³ .............................................. C08K 9/04
[52] U.S. Cl. ................................ 260/42.16; 260/42.53
[58] Field of Search ......................... 260/42.16, 395 B; 428/407

[56] References Cited

U.S. PATENT DOCUMENTS

| | | | |
|---|---|---|---|
| 2,031,260 | 2/1936 | Gams et al. | 260/39 R X |
| 2,068,974 | 1/1937 | Brandenburg | 260/39 R X |
| 2,375,008 | 5/1945 | Lawrence | 428/407 X |
| 3,042,633 | 7/1962 | White | 428/407 X |
| 3,198,647 | 8/1965 | Kress | 260/42.14 |
| 3,224,998 | 12/1965 | Kirkconnell | 260/42.16 |
| 3,821,133 | 6/1974 | Doran et al. | 260/42.16 |
| 3,957,718 | 5/1976 | Pochert et al. | 260/39 SB |
| 3,992,334 | 11/1976 | Harney | 260/39 SB |
| 3,994,742 | 11/1976 | Russell et al. | 260/42.16 |

*Primary Examiner*—Lewis T. Jacobs
*Attorney, Agent, or Firm*—Fleit & Jacobson

[57] ABSTRACT

A method of grafting a polymer to filler materials, which comprises the steps of fixing a predetermined quantity of a surfactant to the mineral particles of said filler materials while keeping free one or a plurality of reactive functions, subsequently adding a product capable of reacting with the still free functions of said surfactant, in order to form in situ an organic polymer which is thus strongly fixed to the mineral filler by a heat treatment at a temperature in the range of 100° to 150° C.

16 Claims, No Drawings

METHOD OF GRAFTING A POLYMER TO FILLER MATERIALS

This is a divisional of application Ser. No. 670,557, filed Mar. 26, 1976, now U.S. Pat. No. 4,129,549, issued Dec. 12, 1978.

The present invention relates to a method of fixing or "grafting" polymerized substances to the surface of inorganic particles of a filler material in order to obtain economically filler materials that are easier to use in miscellaneous industries such as the rubber, plastic or paints industries, while imparting improved properties to the finished products.

In order to improve the compatibility and the physico-chemical bonds of filler materials with organic materials and binders with which they are mixed up, it is already known to perform two types of treatments:

(1) adding organic products and/or various mineral salts to the filler material in order to modify its physico-chemical properties with respect to the medium in which it is to be incorporated, such as:
  dabbing for changing the pH value,
  hydrophobing with the assistance of fatty acids or amines, and
  changing the equilibrium of their surface tension by using dispersing or wetting agents, etc.;

(2) grafting polymers to the surface of mineral particles, i.e. causing the physico-chemical adherence of organic chains to the crystallites, so that when the grafted filler material has been introduced into the medium it will behave therein like an organic substance.

Up to now four types of methods of grafting polymers to filler materials have been used, namely through the medium of:
  organo-metallic compounds,
  isocyanates,
  siloxanes, silanes, and
  solvents containing a hydrocarbon monomer.

However these methods are extremely expensive and delicate.

It is the primary object of the present invention to perform the economical grafting of organic polymers to conventional inorganic fillers, the polymerization thus taking place in situ after applying an organic surfactant to the filler.

This method comprises the steps of:

(1) Strongly fixing (by means of its chemical reactivity, its facility of absorption or its ion exchange capacity) a surfactant or surface-active agent, through one of its reactive functions, to the inorganic filler, while keeping free one or a plurality of its reactive functions;

(2) then adding to the thus coated inorganic filler a product capable of reacting with the free functions of said surfactant, in order to form an organic polymer which will thus adhere strongly to the inorganic filler, whereby the organic polymer is considered as being "grafted" to the inorganic filler.

The surface-active agent or surfactant and its reagent may be selected from a wide range of substances, provided only that they lend themselves to condensation or polymerization reactions.

In a preferred form of embodiment, the method of this invention comprises the steps of:
  fixing a surfactant having aminated functions (i.e. an organic molecule preserving free active —NH— radicals) to the crystallites;
  then causing the available —NH— radicals to react with one another or with the assistance of suitable reagents such as products having an aldehydic function, in order to form
  a polymer grafted to the filler material.

Thus, an aminoplast-type polymer is caused to adhere to the crystallites in a physico-chemical and indestructible manner when the grafted filler material is subsequently introduced into an organic binder, whereby this binder will react with this grafted filler material as it would with an organic substance.

The thus grafted filler materials are particularly suited for use in the rubber industry due to the presence of aminated products participating in the vulcanization.

It was found that in the plastic industry (P.V.C. and propylene) different surfactants should be used for grafting the fillers.

Particularly satisfactory results have been achieved by substituting non-ionic, hydroxylated or polyethoxylated surfactants, such as ethylene glycol, glycerol, polyethylene glycols, glycol ethers for the aminated cationic surfactants.

Reagents consisting of diacids and corresponding to these surfactants, so as to form polyesters, may be selected for example from the group of diacids currently used in the manufacture of polyester, such as:
  phthalic acid,
  maleic acid,
and implemented in the form of their anhydride.

The filler materials adapted to be treated by this grafting method may be of natural or synthetic type:
  silicious fillers: quartz, colloidal silica, kieselguhr, etc.;
  silicated fillers: chalk, calcium carbonate, dolomite, marmor, etc.;
  sulfated fillers: baryte, gypsum, etc.

In the first type of surface active agents, the surfactant having aminated functions and of which the molecule has one end of its chain strongly fixed to the filler material and capable of preserving free and available —NH— active radicals, may be:

(1) a cationic surfactant, such as N-alkyl-amino-alkylamines, that is, di-amines of the R—NH—R'—NH$_2$ type, wherein R is a chain comprising 4 to 24 carbon atoms and R' a chain comprising at the most 6 carbon atoms, said di-amines adhering easily through their —NH$_2$ function to the silicated and sulfated minerals;

(2) an amphoteric surfactant of the amino-acid type, for instance N-alkyl-amino-alkyl carboxylic acids: R—NH—R'—COOH, wherein R and R' are hydrocarbon chains of the same type as in the products recited in the above paragraph (1) and wherein the —COOH function will form a satisfactory compound with carbonated minerals;

(3) a polyethoxylated surfactant, such as N-alkyl-amino-alkylamines, i.e., oxyethylenated di-amines of the type:

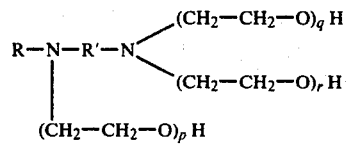

adhering to low chemical reactivity minerals by at least one of their (CH₂—CH₂—O) functions, wherein p, q, r are integers in the range of 3 to 12.

The aminated functions of these three types of surfactants may of course be multiplied linearly in order to dispose of a greater number of free and available —NH— functions for subsequent reactions.

The quantity of surfactants having aminated functions may vary from 0.5 to 50% by weight in relation to the filler material.

For a stable filler material, i.e., not liable to absorb organic products, such as asbestos, chalk, dolomite, kaolinite, marmor, quartz, talc, etc., the percentage of surfactants lies preferably in the range from 0.5 to 10%.

A higher percentage of surfactant may be used with a filler material capable of absorbing organic products, such as attapulgite, montmorillonite, silica gel, and sepiolite.

The surface treatment of the filler material with said surfactant or surfactants is easily achieved by mixing, crushing or triturating the two component substances in the cold state or in a heated state.

The aldehydic-function product capable of reacting in the fashion of aminoplasts on the free and available —NH— functions of the surfactant adhering to the filler material may be:
  saturated in the R—CHO form, such as formal, acetaldehyde, propionaldehyde, furfural, wherein R is a saturated or cyclic hydrocarbon radical,
  ethylenated in the R'CHO form, such as acrylic aldehyde, crotonaldehyde, wherein R' is a hydrocarbon comprising one or a plurality of ethylene linkages,
  a di-aldehydic product, such as glyoxal.

The quantity of aldehydic function reagent to be used is subordinate to the quantity of aminated function surfactant used for treating the filler material; however, 1.5 to 2.5 times the stoichiometric amount are necessary, which as a rule is equivalent to the addition of 0.3 to 30% of reagent in relation to the weight of filler material.

The reaction between the aldehydic-function product, dissolved or not in water, and the filler material treated with the surfactant having aminated functions, is accomplished in the heated state (100° C. or more), for example in a Grignard reactor.

The reactor time is about one hour but depends on temperature.

The water resulting from the condensation developing between the aldehydic function product and the surfactant, and also the water introduced for dissolving the reagent, are then discharged by reversing the cooler of the Grignard reactor and possibly by applying vacuum thereto.

Thus, a polymer of the aminoplast can be grafted to the filler material. For instance, when using a cationic surfactant and a saturated aldehydic function product, the grafted polymer has the form:

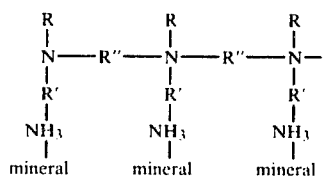

Radical R and R' are derived from the surfactant and radicals R" from the aldehydic-function reagent.

It was also observed that preliminary to, or during, the polymerization reaction, adding a small amount of phenol or a product selected from the phenol group, i.e., 5 to 20% by weight of resorcinol with respect to the surfactant, would improve the reinforcing properties of the filler material grafted according to this invention, which may prove advantageous for its specific applications in the rubber industry.

EXAMPLE 1

For obtaining according to the method of the present invention a grafted filler material, a mixture is prepared in the heated state which comprises:
  a semi-reinforcing filler material such as the product marketed under the Trademark "ARGIREC B-24" by the French Company: ARGILES & MINERAUX "A.G.S.", a very finely divided kaolinite made from kaolinic clay, and
  5 percent of an alkyl-amino-alkylamine comprising part of double bonds such as the product marketed under the trademark "DINORAM S" by the French Company: PIERREFITTE-AUBY.

The thus treated kaolinite filler material is then introduced into a Grignard reactor with 13% of an aqueous 30-percent formal solution.

The reaction at 100° C. with ascending cooler is achieved during one hour. Then the stream of cooler is reversed and the mix is kept at 100° C. under vacuum until the water and the excess reagents are eliminated completely.

The dry product is extracted and reduced to a fine powder, and the grafted filler material thus obtained is tested at 60% and 120% in a conventional natural rubber formula in comparison with Argirec B-24.

After vulcanization, the comparison of the mechanical properties of the rubbers obtained proves that the grafted filler material according to this invention forms a homogeneous compound with natural rubber since it imparts the following improvements thereto:
  the tensile strength is improved by at least 13 percent,
  the A-Shore hardness number is improved by 3 to 4, and
  the tearing strength is improved considerably: 26 to 45 percent.

EXAMPLE 2

The kaolinic filler material obtained as disclosed in Example 1 is treated with 5% of DINORAM S and introduced into a GRIGNARD reactor with 13% by weight of an aqueous solution containing 30% formal and 0.5% resorcinol.

After the process disclosed in Example 1, the grafted filler material thus obtained is tested with natural rubber under the same conditions of operation, with the following results (see Table I hereinafter):
  the tensile strength is increased by at least 20%;
  the A-Shore hardness number is increased by 5 to 6;
  the tearing strength is increased very considerably: 50 to 75%.

This proves that this grafted filler material is particularly suited for use in the rubber industry.

TABLE I

| Percentage of filler | 120 | | | 60 | | |
|---|---|---|---|---|---|---|
| | Argirec | Grafted B-24 | | Argirec | Grafted B-24 | |
| Type of filler | B-24 | Ex. 1 | Ex. 2 | B-24 | Ex. 1 | Ex. 2 |
| Tensile strength (kg/sq.cm) | 190 | 219 | 238 | 260 | 293 | 312 |
| Elongation at rupture (%) | 400 | 350 | 350 | 550 | 450 | 450 |
| A-Shore hardness number | 67 | 71 | 73 | 55 | 58 | 60 |
| Tearing strength (kg/cm) | 40 | 58 | 70 | 50 | 63 | 75 |

The physico-chemical bonds between the organic binders and the grafted filler material according to this method are therefore considerably stronger than those tested when using untreated filler materials or filler materials treated with organic products and/or inorganic salts in order to modify only their surface physico-chemical properties.

Moreover, it appears that this grafted process, in comparison with hitherto known grafting methods, affords considerable savings both through the use of cheaper organic products and due to the facility of manufacturing this grafted filler material.

In the second type of surfactants aforesaid, i.e., non-ionic surfactants, the fillers used are the same as those mentioned hereinabove.

These fillers are treated at temperatures within the range of 110° to 150° C., i.e. with a view to remove the maximum quantity of excess water (—OH—H—OH—H—OH ...) and to substitute a surface-active layer (—OH—H—OH—R) therefor when the product is dried completely and the surfactant is added, this addition being accomplished in a quantity proportional to the specific surface area and to the active points of the filler, and may range from about 0.5% to about 10% by weight of treated filler material.

Acid anhydride may then be added to the thus coated filler for producing the chain reaction with the free hydroxyl functions.

The amounts of anhydride depend on the specific nature and quantity of the surfactants and may therefore range from 1 to 20%.

According to the specific nature of the products involved, the temperature, time and vacuum should be adjusted with a view to obtain the maximum yield from each condensation, esterification and polymerization reaction.

As a rule, the temperatures should be in the range of 110° to 150° C., the reaction time in the range of 15 mn to 2 hours, and finally the vacuum may be necessary for eliminating any water likely to be released during the reactions.

EXAMPLE 1 (concerning the second type of surfactants)

A natural filler material such as talc finely ground so that no particle thereof has a size greater than 50μ (Standard talc OOS produced by the French Company "Société des Talcs de Luzenac") is introduced into a powerful mixer of which the double wall is so heated that the talc temperature becomes stabilized at 130° C. after 15 mn of stirring so as to remove any surface water therefrom, as well as its residual and humidity water.

Then, 3% by weight of glycerol are added to the mixture and the latter is stirred during 15 to 30 mn at the same temperature to obtain the maximum homogeneity and physico-chemical bond between talc and glycerol.

Then 3.2% maleic anhydride are added progressively while stirring the mixture during 15 minutes at 130° C.

Then, the vacuum is applied while stirring during another half-hour.

The grafted filler, wherein the talc is grafted by means of a glycerol polymaleate, is thus ready for use in plastic materials for example at the rate of 40 parts of filler for 60 parts of polypropylene.

The results obtained by using this grafted filler are definitely improved in comparison with the same non-grafted talc, as illustrated by the following Table II:

TABLE II

| Properties | Pure polypropylene | 60 parts of polypropyl. + 40 parts of untreated talc | 60 parts of polypropyl. + 40 parts of grafted OOS talc |
|---|---|---|---|
| Density | 0.905 | 2.4 | 2.1 |
| Rate of incorporation at 165° C. | — | 15' | 6' |
| Tensile strength (kg/sq.mm) | 35 | 32 | 36 |
| Tearing strength (kg/sq.mm) | 35 | 30 | 38 |
| Flexion strength (kg/sq.mm at 20° C.) | 50 | 60 | 58 |
| Impact strength (mJ/sq.mm) | bent | 15 | 45 |
| Flexion module (kg/sq.mm at 20° C.) | 1,300 | 3,300 | 3,600 |
| (kg/sq.mm at 60° C.) | 300 | 1,300 | 1,500 |
| Brinell hardness (kg/sq.mm) | 70 | 82 | 85 |
| Extrusion rate (at 210° C.) | 100 | 110 | 140 |
| Extrusion swelling (at 210° C.) | 70% | 50% | 20% |

This table shows a material improvement of all the properties of the filled polypropylenes, some of these properties being particularly noticeable, such as:
  incorporation rate,
  impact strength,
  flexion module,
  hardness, and
  extrusion rate and swelling.

EXAMPLE 2

A natural filler material (such as chalk free of any particle greater than 12μ, (e.g. "Micronic-O" produced by the French Company: Société des Blancs Mineraux, Paris) is introduced into a mixer having its double wall heated to stabilize the chalk temperature at 130° C. after 15 minutes of energic stirring, so as to free it from any humidity water, surface water and residual water.

2% by weight of 1.4 butanediol diglycidic ether (EDG-1.4-BD prepared by the French Company "Protex") are added, and the mix is stirred during another half-hour at the same temperature to obtain the maximum homogeneity and physico-chemical bond between the chalk and the product.

1.5% of phthalic anydride may then be added gradually while stirring strongly at 130° C. during 15 mn.

Then vacuum is applied during another half-hour while stirring.

The grafted filler, i.e., chalk grafted by a polyphthalate, is thus ready for use in plastic materials, such as 100% P.V.C. with 50% of octyl phthalate as a plastifier.

The results obtained by using this grafted filler are definitely improved in comparison with non-grafted chalk as illustrated in the following Table III:

TABLE III

| Properties | Pure PVC | Chalk-filled PVC | PVC filled with grafted chalk |
|---|---|---|---|
| Incorporation rate | — | 20' | 8' |
| Tensile strength (Kg/sq.cm) | 180 | 115 | 150 |
| Elongation to rupture % | 350 | 220 | 300 |
| Shore Hardness | 89 | 92 | 94 |
| Resistivity | $2.10^{11}$ | $5.10^{11}$ | $7.10^{12}$ |

From this Table, it will be seen that the grafted filler is particularly advantageous, due to the improvement of all its properties, especially resistivity, which makes this product particularly adequate for manufacturing electric cables.

Therefore, these products may be used as filler materials in all industries utilizing as basic materials elastomers or plastomers, i.e., the rubber, plastic, paints, glue industries, etc., in that they facilitate the dispersion while imparting improved mechanical properties to the finished products and articles.

What is claimed as new is:

1. A method of grafting a polymer to an inorganic filler material composed of mineral particles comprising:
   (a) physico-chemically fixing a predetermined quantity of a surfactant to mineral particles, said surfactant being of low molecular weight from about 100 to about 500 and being selected from the group consisting of a cationic surfactant having a primary amino group and at least one other functionally active amino group and an amphoteric surfactant of the amino-acid type having a carboxylic group and at least one functionally active amino group, said physico-chemical fixing being effected by the primary amino group in the case of said cationic surfactant and the carboxylic group in the case of said amphoteric surfactant and thereafter
   (b) reacting the product formed in step (a) at a temperature in the range from about 100° C. to about 150° C. with an organic chemical reagent containing aldehydic functions capable of reacting with the functionally active amino groups of the surfactant to form, in situ, an organic polymer grafted to the mineral filler.

2. The method according to claim 1, wherein the filler material is selected from the group comprising asbestos, dolomite, chalk, kaolinite, marmor, quartz, talc, i.e. substances adapted to absorb only little or no organic product.

3. The method of claim 1 wherein the surfactant is a member selected from the group consisting of:
   (a) a diamine having the general formula R—NH—R'—NH$_2$ in which R is an alkyl group containing from 4 to 24 carbon atoms and R' is an alkyl group containing 6 carbon atoms at most; and
   (b) an amino acid having the general formula R—NH—R'—COOH in which R is an alkyl group containing from 4 to 24 carbon atoms and R' is an alkyl group containing 6 carbon atoms at most; and
the organic chemical reagent is a member selected from the group consisting of:
   (a) a saturated aldehyde having the general formula R"—CHO wherein R" is a saturated or cyclic hydrocarbon radical;
   (b) an ethylenated aldehyde having the general formula R"—CHO in which R" is a hydrocarbon radical containing at least one ethylenic linkage; and
   (c) a dialdehyde.

4. The method of claim 3 wherein the saturated aldehyde is a member selected from the group consisting of formal, acetaldehyde, propionaldehyde, and furfural; the ethylenated aldehyde is a member selected from the group consisting of acrylic aldehyde and crotonaldehyde; and the dialdehyde is glyoxal.

5. The method of claim 1 wherein the quantity of the surfactant ranges from about 0.5 to 50% by weight of the filler material.

6. The method of claim 1 wherein the quantity of the organic chemical reagent containing the aldehyde function ranges from about 0.5 to 50% by weight.

7. The method of claim 5 wherein the quantity of the surfactant ranges from about 0.5 to 10% by weight.

8. The method of claim 6 wherein the quantity of the organic chemical reagent containing the aldehyde function ranges from about 0.5 to 10% by weight.

9. The method of claim 1 wherein the reaction in step (b) is carried out at a temperature of at least 100° C. for about 1 hour.

10. The method of claim 9 wherein the reaction involves a condensation reaction and the formed water of condensation together with water of dilution of the surfactant and organic chemical reagent are removed from the reaction site.

11. The product produced by the method of claim 1.

12. The product produced by the method of claim 3.

13. The product produced by the method of claim 4.

14. The method for facilitating the dispersion of elastomers and plastomers in a formulation selected from the group consisting of a rubber, a plastic, a paint, and a glue while imparting improved mechanical properties to the final product, comprising incorporating into the formulation the product of claim 11.

15. The method for facilitating the dispersion of elastomers and plastomers in a formulation selected from the group consisting of a rubber, a plastic, a paint, and a glue while imparting improved mechanical properties to the final product, comprising incorporating into the formulation the product of claim 12.

16. The method for facilitating the dispersion of elastomers and plastomers in a formulation selected from the group consisting of a rubber, a plastic, a paint, and a glue while imparting improved mechanical properties to the final product, comprising incorporating into the formulation the product of claim 13.

* * * * *